US007005766B2

(12) United States Patent
Suzuki et al.

(10) Patent No.: US 7,005,766 B2
(45) Date of Patent: Feb. 28, 2006

(54) LINEAR ACTUATOR, AND PRODUCTION AND INSPECTION METHOD THEREOF

(75) Inventors: Yuzuru Suzuki, Shizuoka (JP);
Taketoshi Ohyashiki, Shizuoka (JP);
Kazuo Muramatsu, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 164 days.

(21) Appl. No.: 10/786,979

(22) Filed: Feb. 24, 2004

(65) Prior Publication Data

US 2004/0164623 A1    Aug. 26, 2004

(30) Foreign Application Priority Data

Feb. 26, 2003    (JP) .............................. 2003-050099

(51) Int. Cl.
*H02K 7/06* (2006.01)
*F16H 25/24* (2006.01)
(52) U.S. Cl. ......................................... 310/80; 310/83
(58) Field of Classification Search .................. 310/20, 310/80, 83
See application file for complete search history.

(56) References Cited

U.S. PATENT DOCUMENTS 3,913,084 A    10/1975 Bollinger et al. ........... 340/683
6,157,103 A    12/2000 Ohta et al. ................. 310/49 R

FOREIGN PATENT DOCUMENTS

| JP | 08-308205 | 11/1996 |
|----|-----------|---------|
| JP | 2002-122203 | 4/2002 |

OTHER PUBLICATIONS

Machine translation of Japanese reference 08-308205. JP-08-308205 was published Nov. 22, 1996.*

* cited by examiner

*Primary Examiner*—Darren Schuberg
*Assistant Examiner*—Judson H. Jones
(74) *Attorney, Agent, or Firm*—Townsend and Townsend and Crew LLP

(57) ABSTRACT

In a motor portion of a linear actuator, a rear end cap and a front end protrusion, which are disposed respectively at the rear and front ends of a stator assembly, and which include rear and front bearings to rotatably support a rotor assembly, are formed by injection-molding simultaneously and integrally with a stator support member which fixedly supports constituent members of the stator assembly, whereby the stator assembly, the rear end cap, and the front end protrusion can be coaxially aligned to one another with a high degree of precision thus improving the assembling precision of the motor portion. Also, since the front bearing can be attached to the front end protrusion before an output shaft is attached, the rotation characteristic of the rotor assembly can be evaluated before the output shaft is attached.

7 Claims, 4 Drawing Sheets

LINEAR ACTUATOR, AND PRODUCTION AND INSPECTION METHOD THEREOF

BACKGROUND OF THE INVENTION

1. Field of the Invention

The present invention relates to a linear actuator, and production method and inspection method of a linear actuator.

2. Description of the Related Art

A liner actuator, which has its output shaft reciprocating in an axial direction, is recently heavily used in various equipments as a means for generating a linear movement working directly on an object. A linear actuator, in which the travel distance of an output shaft can be precisely controlled, is disclosed in, for example, Japanese Patent Application KOKAI Publication No. 2002-122203 (refer to Paragraphs [0015] to [0021], and FIG. 1 therein).

FIG. 4 is a schematic cross sectional view of a conventional linear actuator. The linear actuator uses a stepping motor which generally comprises a stator assembly 10 and a rotor assembly 20.

The stator assembly 10 includes two stator units, one of which comprises a pair of stator yokes 13a, 13b disposed so as to oppose each other and to sandwich a bobbin 12 having a winding 11 provided therearound, and the other of which comprises a pair of stator yokes 16a, 16b disposed so as to oppose each other and to sandwich a bobbin 15 having a winding 14 provided therearound. The stator yokes 13a, 13b each have an array of pole teeth and are coupled to each other with their respective pole teeth intermeshing with each other. In the same way, the stator yokes 16a, 16b each have an array of pole teeth and are coupled to each other with their respective pole teeth intermeshing each other. The windings 11, 14 are responsible for exciting respective pole teeth of the two stator units. The two stator units structured as described above are coaxially stacked on each other, thus forming the stator assembly 10. The stator yokes 13a, 13b, and 16a, 16b, and the bobbin 12, 15, which are constituent members of the stator assembly 10, are fixed together by means of resin injected. Thus, the stator assembly 10 is shaped substantially hollow-cylindrical and looks like a doughnut, in which the arrays of the pole teeth of the stator yokes 13a, 13b, and 16a, 16b define the inner circumference of the stator assembly 10.

The rotor assembly 20 is housed in the hollow of the cylindrically shaped stator assembly 10. The rotor assembly 20 is composed of a rotor magnet 21 having a plurality of magnetic poles, a resin segment 22 and a female screw 23, and is shaped substantially hollow-cylindrical. The rotor magnet 21 is shaped in a ring, and constitutes the outer circumference of the rotor assembly 20 so as to oppose the pole teeth defining the inner circumference of the stator assembly 10. The resin segment 22 is shaped in a tube and fixedly disposed inside the ring-shaped rotor magnet 21, and the female screw 23 is fixedly disposed inside the tube-shaped resin segment 22.

The stator assembly 10 has a rear end cap 30 formed at its rear end face so as to cover the hollow of the stator assembly 10. The rear end cap 30 is formed of resin which is injected simultaneously at the process of resin injection-molding performed to fix together the constituent members of the stator assembly 10. The rear end cap 30 has a circular cavity 31 on an inner side thereof facing the rotor assembly 20, and a rear ball bearing 32 is fitted into a circular recess which is formed on the inner side of the rear end cap 30 so as to be concentric with the cavity 31. The rear ball bearing 32 rotatably supports the rear end of the rotor assembly 20.

The rearward portion (toward a rear end 40b) of an output shaft 40 is movably inserted through the hollow-cylindrical rotor assembly 20, and is threaded thereby forming a male screw 41, which engages threadedly with the female screw 23 disposed inside the rotor assembly 20.

The stator assembly 20 has a front end cap 50 attached to its front end face. The front end cap 50 has a center hole 51, and a groove 54 formed on its inner circumference so as to extend along the longitudinal direction of the output shaft 40. The frontward portion (toward a front end 40a) of the output shaft 40 goes movably through the center hole 51 so as to protrude from the front end cap 50. The front end cap 50 further has a circular recess 52 formed on its inner side so as to be concentric with the center hole 51, and a front ball bearing 53 is fitted into the recess 52. The ball bearing 53 rotatably supports the front end of the rotor assembly 20.

The output shaft 40 has a stopper pin 42 formed at an area of its frontward portion within the extent of the groove 54 of the front end cap 50. The stopper pin 42 prohibits or restricts rotation of the output shaft 40, whereby the output shaft 40 is put into a linear motion in an axial direction when the rotor assembly 20 rotates.

In the linear actuator described above with reference to FIG. 4, when current is caused to flow in the windings 11, 14, the pole teeth of the stator assembly 10 are excited thereby causing the rotor assembly 20 having the rotor magnet 21 to rotate with respect to the stator assembly. The rotary motion of the rotor assembly 20 is converted into a linear motion of the output shaft 40, for example, in a frontward direction by way of the female screw 23 and the male screw 41 threadedly engaging with each other, and when the rotational direction of the rotor assembly 20 is reversed, the output shaft 40 is linearly moved in a reverse direction, that is, in a rearward direction.

In the linear actuator shown in FIG. 4, while the rear end cap 30 can be precisely aligned coaxially with the stator assembly 10 thanks to the rear end cap 30 being formed by the aforementioned simultaneous resin injection-molding process performed to produce the stator assembly 10, the front end cap 50, which is press-fitted into the hollow of the stator assembly 10, is not necessarily aligned coaxially with the stator assembly 10 depending on the dimensional accuracy of relevant components thus failing to ensure an assembly accuracy.

Also, for ensuring the quality of the linear actuator, the rotor assembly 20 is rotated to check noises generated thereby for the purpose of evaluating the rotation characteristic of the rotor assembly 20 with respect to the stator assembly 10. In this connection, the rotor assembly 20 can be duly rotated only after the front end cap 50 with the front ball bearing 53 fixed thereto is attached to the stator assembly 10 where the output shaft 40 is put through the center hole 51 of the front end cap 50 with its rearward portion positioned inside the rotor assembly 20. The rotation characteristic of the rotor assembly 20 with respect to the stator assembly 10 is evaluated by checking noises generated by the rotation, but the noises are drowned out by other noises generated by the female screw 23 and the male screw 41 threadedly engaging with each other thus hindering an accurate evaluation.

Further, since the travel amount of the output shaft 40 allowed for the axial direction is limited, the output shaft 40 cannot be moved continuously in one same direction, which means that the rotor assembly 20 cannot be rotated continuously in one same direction. This makes the evaluation by noises increasingly difficult and troublesome.

SUMMARY OF THE INVENTION

The present invention has been made in light of the above problems, and it is an object of the present invention to provide a linear actuator which can be assembled with a high precision, and which allows the rotation characteristic thereof to be evaluated easily with a high accuracy.

In order to achieve the object, according to a first aspect of the present invention, a linear actuator comprises a stator assembly, a rotor assembly, a rear end cap, a front end protrusion, a front bearing, an output shaft, and front end cap, wherein: the stator assembly is shaped into a cylinder defining a hollow, includes a plurality of windings, a plurality of stator yokes each having an array of pole teeth which define an inner circumference of the stator assembly and which are excited by each of the windings, and a yoke support member formed of resin by injection-molding, and supports integrally the windings and the stator yokes; the rotor assembly is shaped into a hollow-cylinder, housed rotatably in the hollow of the stator assembly, and includes a ring-shaped magnet constituting an outer circumference of the rotor assembly and opposing the pole teeth of the stator assembly with a clearance therebetween, and a female screw disposed at an inner circumference of the rotor assembly; the rear end cap is positioned at a rear end of the stator assembly, integrally formed of the resin injected simultaneously when injection-molding the yoke support member of the stator assembly, and supports rotatably a rear end of the rotor assembly; the front end protrusion is positioned at a front end of the stator assembly, shaped into a ring concentric with the stator assembly, has an inner diameter larger than a diameter of the hollow of the stator assembly, and is integrally formed of the resin injected simultaneously when injection-molding the yoke support member of the stator assembly; the front bearing defines an opening at its center, is detachably fitted into the front end protrusion, and supports rotatably a front end of the rotor assembly; the output shaft has a male screw which is formed at a rearward portion thereof and which engages threadedly with the female screw of the rotor assembly, goes through the opening of the front bearing and through the rotor assembly; and wherein the front end cap is disposed at the front end of the stator assembly, has a hole for guiding the output shaft, and is attached to the stator assembly so as to be fitted onto an outer circumference of the front end protrusion.

In the first aspect of the present invention, the linear actuator may further comprise a bearing provided at the rear end cap so as to rotatably support the rear end of the rotor assembly.

According to a second aspect of the present invention, a production method of the linear actuator according to the one aspect comprises the steps of a stator assembling process, a rotor assembling process, a motor assembling process, an output shaft attaching process, and a front end cap attaching process. At the stator assembling process, a stator assembly, a rear end cap, and a front end protrusion are simultaneously and integrally produced by resin injection-molding, wherein the stator assembly is shaped into a cylinder defining a hollow, and includes in an integrally holding manner a plurality of windings, and a plurality of stator yokes each having an array of pole teeth which are excited by the windings and which constitute an inner circumference of the stator assembly, the end cap is fixedly formed at a rear end of the stator assembly so as to cover at least a portion of the hollow of the stator assembly, and wherein the front end protrusion is formed at a front end of the stator assembly, is shaped into a ring concentric with the stator assembly, and has an inner diameter larger than a diameter of the hollow of the stator assembly. At the rotor assembling process, a rotor assembly is produced which is shaped into a hollow-cylinder, has a ring-shaped magnet constituting an outer circumference thereof and opposing the pole teeth of the stator assembly, and which has a female screw disposed at an inner circumference thereof. At the motor assembling process, the rotor assembly is put in the hollow of the stator assembly, and a bearing having an opening at its center is press-fitted to an inner circumference of the front end protrusion thereby producing a motor portion in which rear and front ends of the rotor assembly are rotatably supported respectively by the rear end cap and the bearing fitted into the front end protrusion. At the output shaft attaching process, an output shaft having a male screw formed at a rearward portion thereof is inserted through the opening of the bearing so as to make the male screw engage threadedly with the female screw of the rotor assembly whereby the output shaft moves linearly in an axial direction when the rotor assembly rotates. And, at the front end cap attaching process, a front end cap having a hole for guiding the output shaft is attached to the front end of the stator assembly.

In the second aspect of the present invention, the production method may further comprise a motor characteristic evaluation process to be performed after the motor assembling process and before the output shaft attaching process. At the motor characteristic evaluation process, the rotor assembly put in the stator assembly is rotated by exciting the pole teeth thereby evaluating a rotation characteristic of the rotor assembly with respect to the stator assembly.

In the second aspect of the present invention, the motor characteristic evaluation process may be performed by checking noises generated by rotation of the rotor assembly.

In the second aspect of the present invention, a bearing to rotatably support the rear end of the rotor assembly may be attached to the rear end cap before the rotor assembly is put in the hollow of the stator assembly at the motor assembling process.

According to a third aspect of the preset invention, an inspection method of the linear actuator according to the first aspect of the present invention comprises the steps of: rotating the rotor assembly such that the pole teeth of the stator assembly are excited by causing current to flow in the windings after the rotor assembly is set in the hollow of the stator assembly, after the front bearing is attached to the front end protrusion, and before the output shaft is inserted through the rotor assembly; and performing a motor characteristic evaluation in which a rotation characteristic of the rotor assembly is evaluated by checking noises generated by the rotor assembly rotating with respect to the stator assembly.

Consequently, since the rear end cap, and the front end protrusion are formed simultaneously and integrally when the stator support member of the stator assembly is injection-molded, the rotor assembly can be precisely coaxial with the stator assembly. Also, since the rotor assembly can be rotated before the output shaft is attached, the rotation characteristic of the rotor assembly with respect to the stator assembly can be evaluated without the output shaft being attached.

BRIEF DESCRIPTION OF THE DRAWINGS

The above object and other advantages of the present invention will become more apparent by describing in detail the preferred embodiment of the present invention with reference to the attached drawings, in which.

Figure 1:
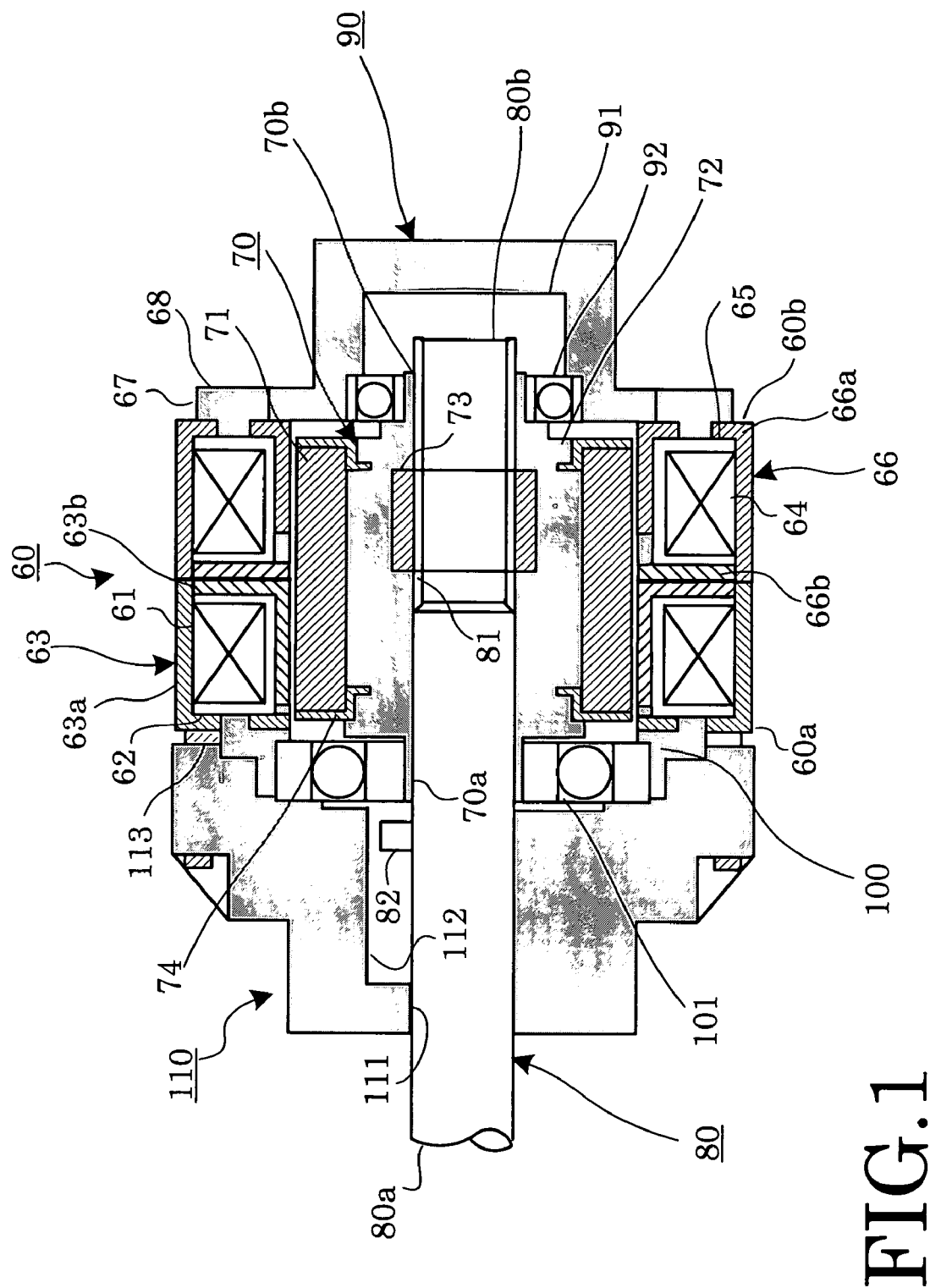
FIG. 1 is a schematic cross sectional view of a linear actuator according to a first embodiment of the present invention.

DETAILED DESCRIPTION OF THE PREFERRED EMBODIMENTS (First Embodiment)

A linear actuator according to a first embodiment of the present invention will be described with reference to FIG. 1. A linear actuator shown in FIG. 1 generally comprises: a stator assembly 60; a rotor assembly 70 to rotate with respect to the stator assembly 70; and an output shaft 80 adapted to linearly move when the rotor assembly 70 rotates.

The stator assembly 60 includes two stator units 63, 66. One stator unit 63 of the two is composed of two stator yokes 63a, 63b disposed so as to oppose each other sandwiching a bobbin 62 having a winding 61 provided therearound, and the other stator unit 66 of the two is composed of two stator yokes 66a, 66b disposed so as to oppose each other sandwiching a bobbin 65 having a winding 64 provided therearound. The stator yokes 63a, 63b each have an array of pole teeth and are coupled to each other with their respective arrayed pole teeth intermeshing with each other. In the same way, the stator yokes 66a, 66b each have an array of pole teeth and are coupled to each other with their respective arrayed pole teeth intermeshing with each other. The windings 61, 64 are responsible for exciting respective pole teeth of the stator units 63, 66.

The two stator units 63, 66 are coaxially stacked on each other thereby forming the stator assembly 60. The stator yokes 63a, 63b, and 66a, 66b, and the bobbins 62, 65, which are constituent members of the stator assembly 60, are integrally fixed together by means of a yoke support member 67 which is formed of resin 68 filled by injection-molding. Thus, the stator assembly 60 is shaped substantially hollow-cylindrical and looks like a doughnut, in which the arrayed pole teeth of the stator yokes 63a, 63b, and 66a, 66b define the inner circumference of the stator assembly 60. The pole teeth of the stator yokes 63a, 63b are appropriately shifted from the pole teeth of the stator yokes 66a, 66b for enabling two-phase driving.

The rotor assembly 70 is housed in the hollow of the cylindrically shaped stator assembly 60. The rotor assembly 70 is also shaped substantially hollow-cylindrical, and comprises a rotor magnet 71, a resin segment 72 and a female screw 73. The rotor magnet 71 is shaped in a ring, has a plurality of magnetic poles, and constitutes the outer circumference of the rotor assembly 70 so as to oppose the pole teeth defining the inner circumference of the stator assembly 60. The resin segment 72 is shaped in a tube, and fixedly disposed inside the rotor magnet 71, and the female screw 73 is fixedly disposed inside the resin segment 72.

The stator assembly 60 has a rear end cap 90 disposed at a rear end face thereof so as to cover the hollow of the stator assembly 60. The rear end cap 90 is formed of the resin 68 filled in simultaneously when the yoke support member 67 of the stator assembly 60 is formed by injection-molding, thus the rear end cap 90 is structured integrally with the stator assembly 60. The rear end cap 90 has a circular cavity 91 on an inner side thereof facing the rotor assembly 70, and a rear ball bearing 92 is fitted into a circular recess formed concentric with the cavity 91. The rear ball bearing 92 rotatably supports the rear end of the rotor assembly 70.

The rearward portion (toward a rear end 80b) of the output shaft 80 is movably inserted through the rotor assembly 70, and is threaded thereby forming a male screw 81, which engages threadedly with the female screw 73 of the rotor assembly 60. The output shaft 80 has a round cross section and has a stopper pin 82 formed at its frontward portion (toward a front end 80a).

The stator assembly 60 has a front end protrusion 100 formed at a front end face 60a thereof. The front end protrusion 100 is shaped in a ring and formed of the resin 68 by resin injection-molding simultaneously and integrally when the yoke support member 67 is formed. The inner diameter of the front end protrusion 100 is larger than the inner diameter (=the diameter of the hollow) of the stator assembly 60, and a front ball bearing 101 is fitted at the inner circumference of the front end protrusion 100. The front ball bearing 101 rotatably supports the front end of the rotor assembly 70. The output shaft 80 goes movably through the center of the front ball bearing 101, namely, the center of the rotor assembly 70.

The stator assembly 60 has a front end cap 110 provided at the front end face 60a thereof so as to cover the hollow of the stator assembly 60 housing the rotor assembly 70. The front end cap 110 is attached to the front end face 60a of the stator assembly 60 such that the inner circumference of the front end cap 110 is fitted onto the outer circumference of the front end protrusion 100 formed at the front face 60a. The front end cap 110 has a round center hole 111, though which the output shaft 80 is movably inserted, and the output shaft 80 has a front end 80a thereof sticking out from the front end cap 110. The front end cap 110 has also a groove 112 formed on an inner circumference thereof. The groove 112 extends in an axial direction and lodges the stopper pin 82 movably in the axial direction thereby allowing the output shaft 80 to move in the axial direction while prohibiting or restricting rotation of the output shaft 80, whereby the output shaft 80 travels linearly in the axial direction when the rotor assembly 70 rotates.

Figure 2:
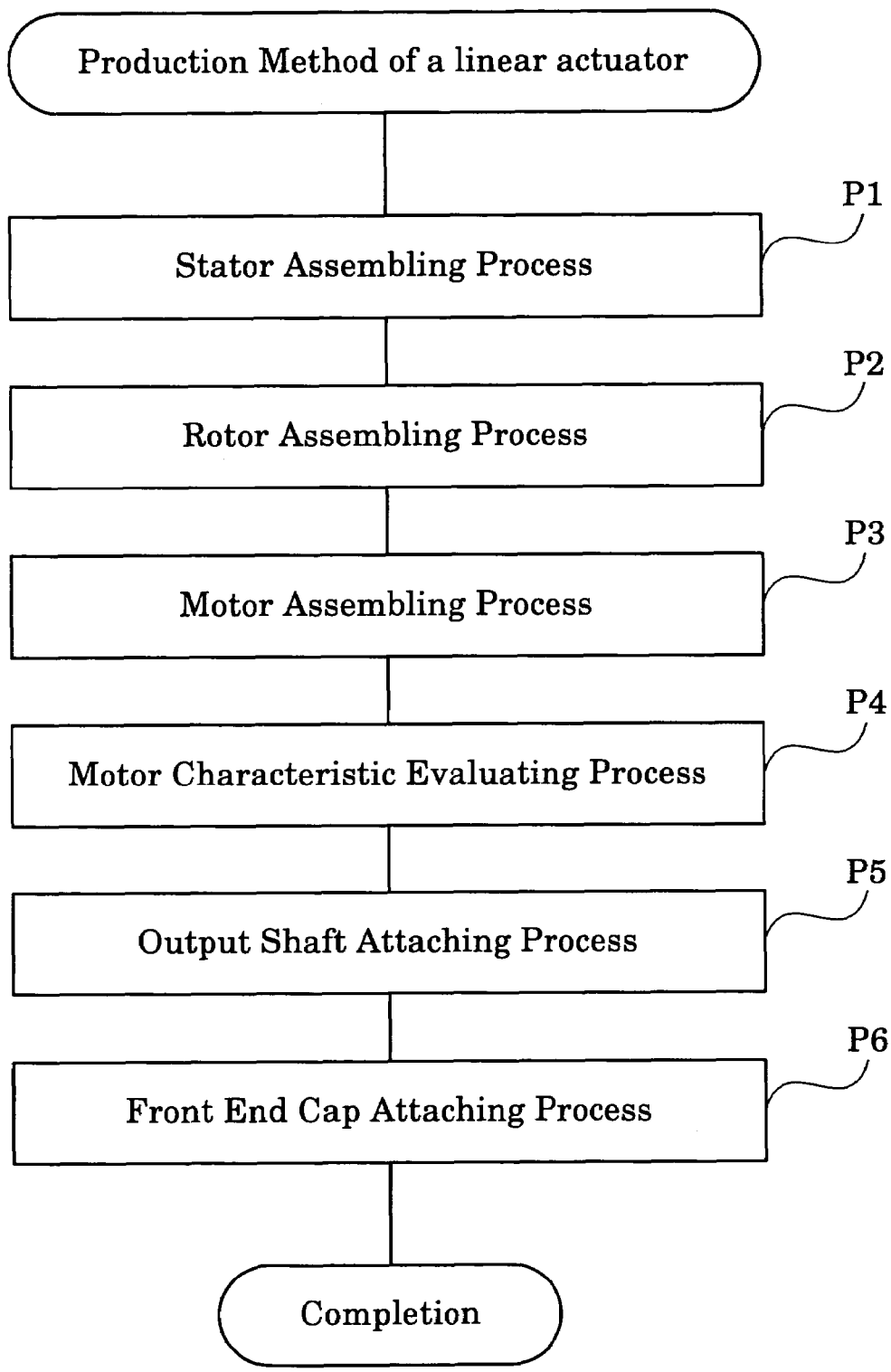
FIG. 2 is a flow chart of a production method of the linear actuator of FIG. 1.

A production method, including an inspection/evaluation process, of the linear actuator will hereinafter be described. Referring to FIG. 2, the production method comprises the steps of: a stator assembling process P1; a rotor assembling process P2; a motor assembling process P3; a motor characteristic evaluating process P4; an output shaft attaching process P5; and a front end cap attaching process P6.

At the stator assembling process P1, not only the stator assembly 60, but also the rear end cap 90 and the front end protrusion 100 are produced. Specifically, the stator yokes 63a, 63b sandwiching the bobbin 62 having the winding 61 therearound, and the stator yokes 66a, 66b sandwiching the bobbin 65 having the winding 64 therearound are set at a prescribed position in a tool, and are injection-molded with the resin 68, for example, polybutyleneterephthalate (PBT). By the injection-molding, the bobbins 62, 65 having respective windings 61, 64, and the stator yokes 63a, 63b, and 66a, 66b are fixedly held together as a single solid body thus forming the stator assembly 60, and at the same time the rear end cap 90 and the front end protrusion 100 are formed of the resin 68 integrally with the stator assembly 60.

At the rotor assembling process P2, the rotor assembly 70 is produced such that the rotor magnet 71, the female screw 73, and a magnet stopper 74 for appropriately positioning the rotor magnet 71 are set in a prescribed position of a tool, and are injection-molded with resin, for example, PBT, which will constitute the resin segment 72 when cured. And the rotor magnet 71 is magnetized so as to have a plurality of magnetic poles.

At the motor assembling process P3, the rear ball bearing 92 is fitted into the cavity 91 of the rear end cap 90, the rotor assembly 70 is put in the hollow of the stator assembly 60, and the front ball bearing 101 is fitted to the inner circumference of the front end protrusion 100, thus the rotor assembly 70 is rotatably supported by the ball bearings 92 and 101. In other words, a motor portion of the linear actuator of FIG. 1 without the output shaft 80 is produced at this process.

At the motor characteristic evaluating process P4, in the motor portion without the output shaft 80 attached, current is caused to flow in the windings 61, 64 thereby exciting the stator yokes 63a, 63b, and 66a, 66b in order to cause the rotor assembly 70 to rotate with respect to the stator assembly 60. A rotation characteristic of the rotor assembly 70 is evaluated by checking noises generated from the rotation of the rotor assembly 70. If the noises are abnormal, the rotor assembly 70 is rated as defective and removed from the stator assembly 60 for replacement.

At the output shaft attaching process P5, the output shaft 80 having the male screw 81 formed at its rearward portion (toward the rear end 80b) is inserted through the hollow of the rotor assembly 70 such that the output shaft 80 is rotated so that the male screw 81 engages threadedly with the female screw 73 of the stator assembly 60.

At the front end cap attaching process P6, a metal fitting 113, which is shaped into a ring, and which has a plurality of projections (not shown) extending outward axially, is fixedly attached by, for example, welding to the front end face 60a of the stator assembly 60, then the front end cap 110 is placed over the metal fitting 60 with some portions (for example, cavities) thereof touching some portions (for examples, bosses) of the front end face 60a, and the projections of the metal fitting 113 are bent so as to hook the front end cap 110, thus the front end cap 110 is fixedly attached to the stator assembly 60 completing the linear actuator of FIG. 1.

The linear actuator of FIG. 1 has following advantages:

(1) Since the stator assembly 60, the rear end cap 90, and the front end protrusion 100 are formed simultaneously by injection-molding at one same process, the stator assembly 60, and the rear and front ball bearings 92, 101 attached respectively to the rear end cap 90 and the front end protrusion 100 can be concentric with one another with a high accuracy thus resulting in reducing defects;

(2) Since the characteristic evaluation is performed by checking noises on the motor portion without the output shaft 80 attached, noises generated due to the existence of the output shaft 80 are not involved during the evaluation work, whreby the evaluation can be performed by checking noises generated only from the rotation of the rotor assembly 70 with respect to the stator assembly 60. Consequently, the evaluation comes up with an increased accuracy, and possibly in a reduced time;

(3) Thanks to the evaluation performed on the motor portion without the output shaft 80 attached, the rotor assembly 70 can be continuously rotated in one direction without paying attention to the travel distance of the output shaft 80. Consequently, the evaluation work can be done easily, thereby possibly reducing an evaluation time; and (4) The evaluation performed on the motor portion without the output shaft 80 attached makes it happen that defects can be identified before a linear actuator is finally completed, and that a linear actuator found to be defective at the evaluation process can possibly revive by replacing only the rotor assembly 70 instead of wasting all the components assembled for a completed linear actuator.

(Second Embodiment)

Figure 3:
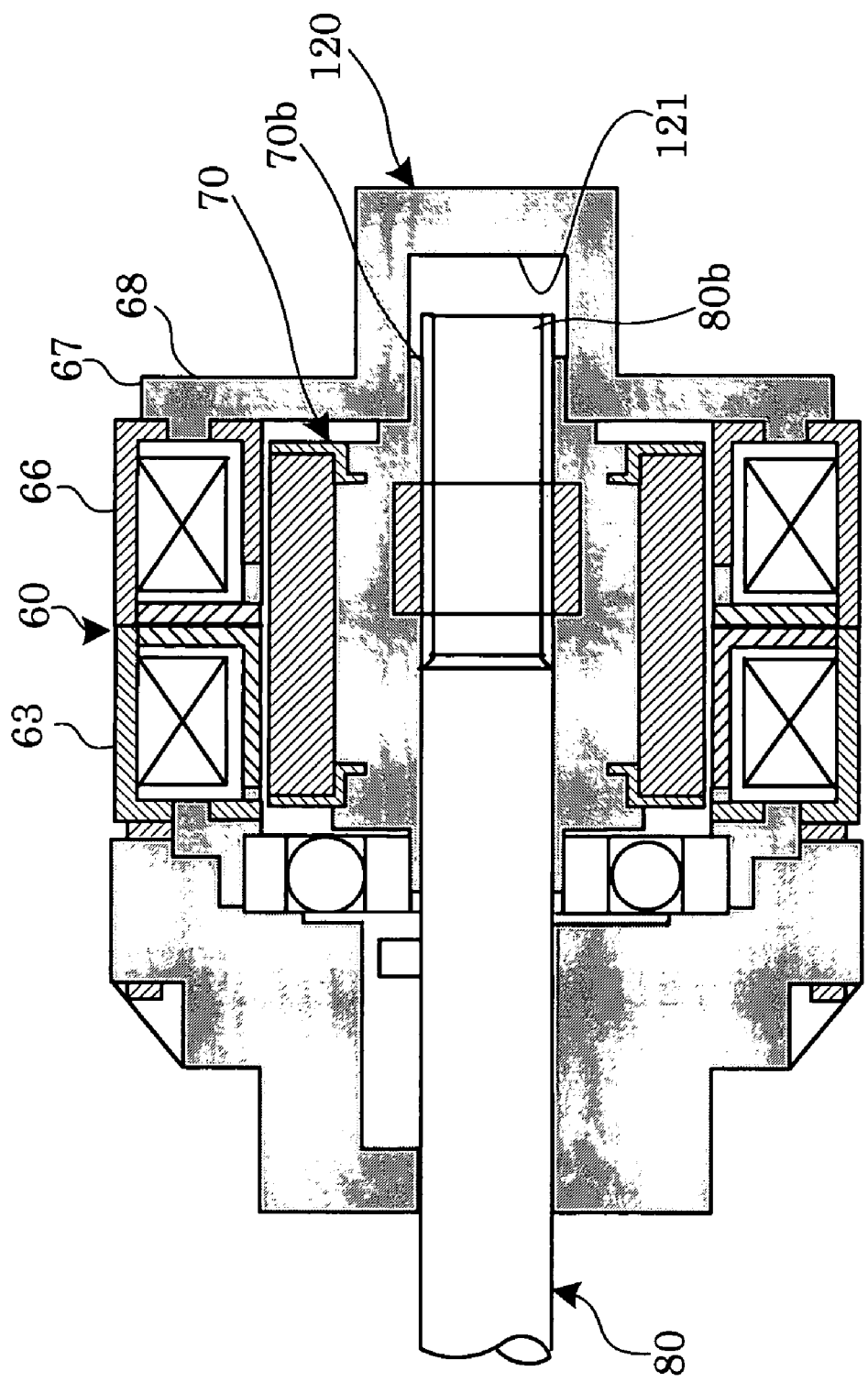
FIG. 3 is a schematic cross sectional view of a linear actuator according to a second embodiment of the present invention.
Figure 4:
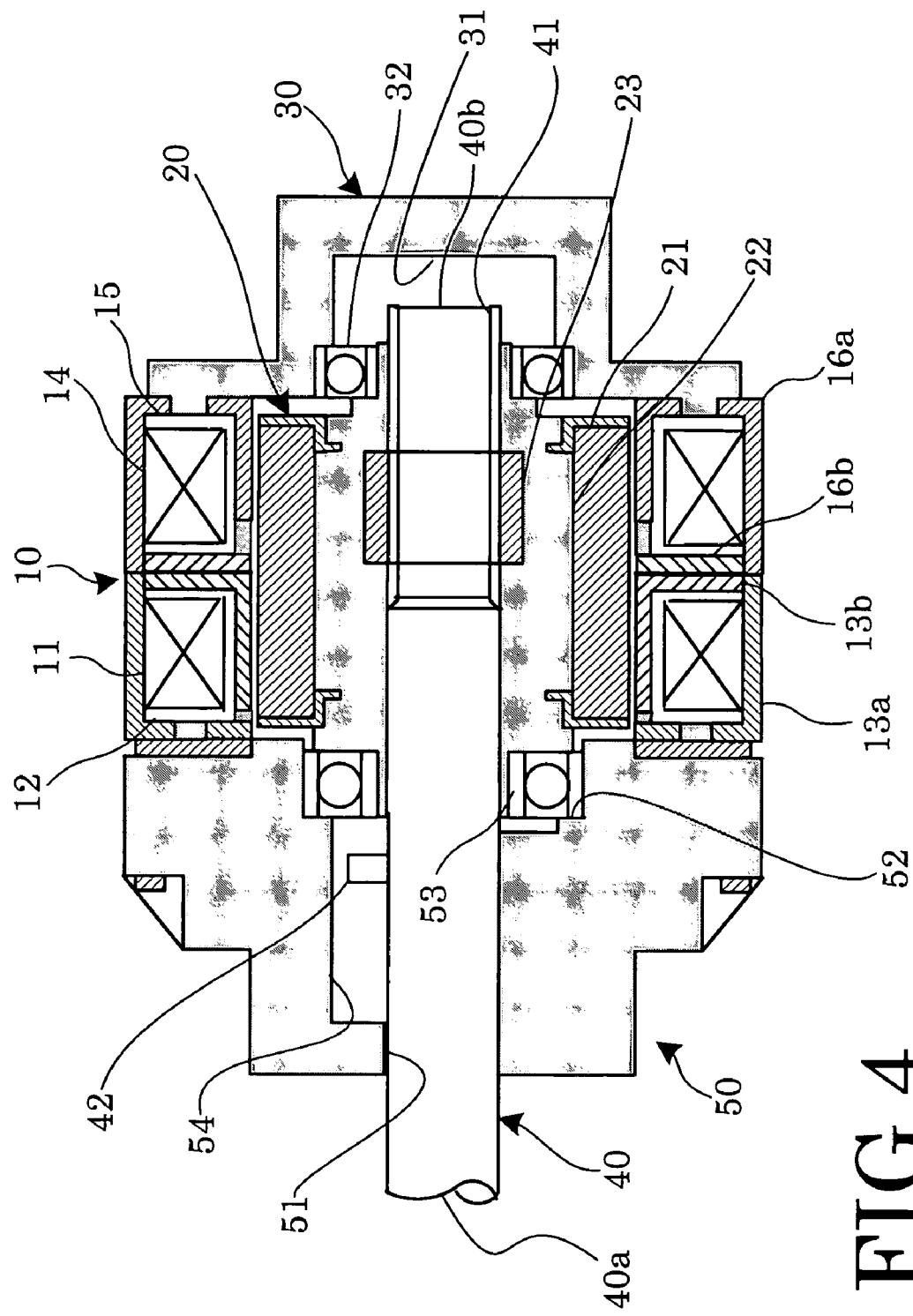
FIG. 4 is a schematic cross sectional view of a conventional linear actuator.

A linear actuator according to a second embodiment of the present invention will hereinafter be described with reference to FIG. 3. In FIG. 3, like reference numerals refer to like elements in FIG. 1. The linear actuator according to the second embodiment differs from the above described linear actuator according to the first embodiment in that a rear end cap 120 is disposed in place of the rear end cap 90 and that the rear ball bearing 92 is eliminated.

The rear end cap 120 is formed of resin 68 integrally with a yoke support member 67 of a stator assembly 60 by injection-molding simultaneously when the stator assembly 60 is formed. The rear end cap 120 has a circular cavity 121 which is concentric with the hollow of the stator assembly 60, and which rotatably supports the rear end of a rotor assembly 70.

Since the linear actuator according to the second embodiment eliminates the rear ball bearing 92 employed in the first embodiment, the number of components can be reduced. The cavity 121 is formed when the rear end cap 120 is injection-molded integrally with the yoke support member 67 of the stator assembly 60 and therefore can be highly concentric with the rotor assembly 60 thereby maintaining the precision level achieved in the first embodiment.

While the present invention has been illustrated and explained with respect to specific embodiments thereof, it is to be understood that the present invention is by no means limited thereto. For example: the front bearing 101 may be replaced by a sleeve bearing; the output shaft 80 may have a cross sectional configuration different from the round configuration (for example, D-cut shape) with the center hole 111 of the front end cap 110 being shaped corresponding to the cross sectional configuration of the output shaft 80 thereby prohibiting rotation of the output shaft 80 without help of the stopper pin 82; the rotor assembling process P2 may be performed prior to the stator assembling process P1; in the evaluation process P4, the evaluation may be performed by an apparatus to obtain the noises generated from the rotation of the rotor assembly 70 as electric signals, detect an abnormal spectrum component among the signals and determine whether or not the rotor assembly 70 is defective based on the detection results; and in the evaluation process P4, the rotation characteristic may be evaluated by other methods than checking noises, where the inspection can be performed on the motor portion without the output shaft 80 attached thereby achieving an increased accuracy. All changes that come within the meaning and range of equivalency of the claims are to be embraced within their scope.

This application is based on Japanese Patent Application No. 2003-50099 filed on Feb. 26, 2003 and including specification, claims, drawings and summary. The disclosure of above Japanese Patent Application is incorporated herein by reference in its entirety.

What is claimed is:

1. A linear actuator comprising:
a stator assembly shaped into a cylinder defining a hollow, the stator assembly including
  a plurality of windings,
  a plurality of stator yokes each having an array of pole teeth which define an inner circumference of the stator assembly and which are excited by each of the windings, and
  a yoke support member formed of resin by injection-molding, and integrally supporting the windings and the stator yokes;
a rotor assembly shaped into a hollow-cylinder, and rotatably housed in the hollow of the stator assembly, the rotor assembly including
  a ring-shaped magnet constituting an outer circumference of the rotor assembly, and opposing the pole teeth of the stator assembly with a clearance therebetween, and
  a female screw disposed at an inner circumference of the rotor assembly;
a rear end cap positioned at a rear end of the stator assembly, integrally formed of the resin injected simultaneously when injection-molding the yoke support member of the stator assembly, and rotatably supporting a rear end of the rotor assembly;
a front end protrusion positioned at a front end of the stator assembly, shaped into a ring concentric with the stator assembly, having an inner diameter larger than a diameter of the hollow of the stator assembly, and integrally formed of the resin injected simultaneously when injection-molding the yoke support member of the stator assembly;
a front bearing defining an opening at its center, detachably fitted into the front end protrusion, and rotatably supporting a front end of the rotor assembly;
an output shaft having a male screw which is formed at a rearward portion thereof and which engages threadedly with the female screw of the rotor assembly, the output shaft going through the opening of the front bearing and through the rotor assembly; and
a front end cap disposed at the front end of the stator assembly, having a hole for supporting movably and guiding the output shaft, and attached to the stator assembly so as to be fitted onto an outer circumference of the front end protrusion.

2. A linear actuator according to claim 1, further comprising a bearing provided at the rear end cap so as to rotatably support the rear end of the rotor assembly.

3. A production method of a linear actuator, the production method comprising the steps of:
a stator assembling process, at which a stator assembly, a rear end cap, and a front end protrusion are simultaneously and integrally produced by resin injection-molding: wherein the stator assembly is shaped into a cylinder defining a hollow, and includes in an integrally holding manner a plurality of windings, and a plurality of stator yokes each having an array of pole teeth which are excited by the windings and which constitute an inner circumference of the stator assembly; the end cap is formed at a rear end of the stator assembly so as to cover at least a portion of the hollow of the stator assembly; and wherein the front end protrusion is formed at a front end of the stator assembly, shaped into a ring concentric with the stator assembly, and has an inner diameter larger than a diameter of the hollow of the stator assembly;
a rotor assembling process, at which a rotor assembly is produced that is shaped into a hollow-cylinder, has a ring-shaped magnet constituting an outer circumference thereof and opposing the pole teeth of the stator assembly, and that has a female screw disposed at an inner circumference thereof;
a motor assembling process, at which the rotor assembly is put in the hollow of the stator assembly, and a bearing having an opening at its center is press-fitted to an inner circumference of the front end protrusion thereby producing a motor portion wherein rear and front ends of the rotor assembly are rotatably supported respectively by the rear end cap and the bearing fitted into the front end protrusion;
an output shaft attaching process, at which an output shaft having a male screw formed at a rearward portion thereof is inserted through the opening of the bearing so as to make the male screw engage threadedly with the female screw of the rotor assembly whereby the output shaft moves linearly in an axial direction when the rotor assembly rotates; and
a front end cap attaching process, at which a front end cap having a hole for supporting movably and guiding the output shaft is attached to the front end of the stator assembly.

4. A production method of a linear actuator according to claim 3, further comprising a motor characteristic evaluation process which is performed after the motor assembling process and before the output shaft attaching process, and at which the rotor assembly put in the stator assembly is rotated by exciting the pole teeth thereby evaluating a rotation characteristic of the rotor assembly with respect to the stator assembly.

5. A production method of a linear actuator according to claim 4, wherein the motor characteristic evaluation process is performed by checking noises generated by rotation of the rotor assembly.

6. A production method of a linear actuator according to claim 3, wherein a bearing to rotatably support the rear end of the rotor assembly is attached to the rear end cap before the rotor assembly is put in the hollow of the stator assembly at the motor assembling process.

7. An inspection method of a linear actuator which comprises:
a stator assembly shaped into a cylinder defining a hollow, the stator assembly including
  a plurality of windings,
  a plurality of stator yokes each having an array of pole teeth which constitute an inner circumference of the stator assembly and which are excited by each of the windings, and
  a yoke support member formed of resin by injection-molding, and integrally supporting the windings and the stator yokes;
a rotor assembly shaped into a hollow-cylinder, and rotatably housed in the hollow of the stator assembly, the rotor assembly including
  a ring-shaped magnet constituting an outer circumference of the rotor assembly and opposing the pole teeth of the stator assembly with a clerance therebetween,
  a female screw disposed at an inner circumference of the rotor assembly;
a rear end cap positioned at a rear end of the stator assembly, formed of the resin injected simultaneously when injection-molding the yoke support member of the stator assembly, and rotatably supporting a rear end of the rotor assembly;

a front end protrusion positioned at a front end of the stator assembly, shaped into a ring concentric with the stator assembly, having an inner diameter larger than a diameter of the hollow of the stator assembly, and formed of the resin injected simultaneously when injection-molding the yoke support member of the stator assembly;

a front bearing having an opening at its center, detachably fitted to the front end protrusion, and rotatably supporting a front end of the rotor assembly;

an output shaft having a male screw which is formed at a rearward portion thereof and which engages threadedly with the female screw of the rotor assembly, the output shaft going through the opening of the front bearing and through the rotor assembly; and a front end cap disposed at the front end of the stator assembly, having a hole for supporting movably and guiding the output shaft, and attached to the stator assembly so as to be fitted onto an outer circumference of the front end protrusion, the inspection method comprising the steps of:

rotating the rotor assembly such that the pole teeth of the stator assembly are excited by causing current to flow in the windings after the rotor assembly is set in the hollow of the stator assembly, after the front bearing is attached to the front end protrusion, and before the output shaft is inserted through the rotor assembly; and performing a motor characteristic evaluation in which a rotation characteristic of the rotor assembly is evaluated by checking noises generated by the rotor assembly rotating with respect to the stator assembly.

* * * * *